US010116970B1

(12) United States Patent
Banerjee

(10) Patent No.: US 10,116,970 B1
(45) Date of Patent: Oct. 30, 2018

(54) VIDEO DISTRIBUTION, STORAGE, AND STREAMING OVER TIME-VARYING CHANNELS

(71) Applicant: EMPIRE TECHNOLOGY DEVELOPMENT LLC, Wilmington, DE (US)

(72) Inventor: Debarag Banerjee, Los Altos Hills, CA (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 15/581,758

(22) Filed: Apr. 28, 2017

(51) Int. Cl.
*H04N 7/173* (2011.01)
*H04N 21/231* (2011.01)
*H04N 21/236* (2011.01)
*H04N 21/234* (2011.01)
*H04N 19/177* (2014.01)
*H04N 19/176* (2014.01)
*H04N 21/24* (2011.01)

(52) U.S. Cl.
CPC ..... *H04N 21/23113* (2013.01); *H04N 19/176* (2014.11); *H04N 19/177* (2014.11); *H04N 21/234* (2013.01); *H04N 21/236* (2013.01); *H04N 21/2402* (2013.01)

(58) Field of Classification Search
CPC ......... H04N 21/4384; H04N 21/44004; H04N 21/6375; H04N 5/44
See application file for complete search history.

(56) References Cited

U.S. PATENT DOCUMENTS

| | | | |
|---|---|---|---|
| 7,272,658 B1 | 9/2007 | Edelman et al. | |
| 7,630,570 B1 | 12/2009 | Haskell et al. | |
| 7,974,233 B2 | 7/2011 | Banerjee | |
| 8,386,630 B1 | 2/2013 | Atzmon | |
| 8,837,601 B2 | 9/2014 | Ronca et al. | |
| 2010/0146569 A1 | 6/2010 | Janardhan et al. | |
| 2011/0267951 A1* | 11/2011 | Stanwood | H04L 41/5022 370/235 |
| 2012/0030723 A1 | 2/2012 | Baum et al. | |
| 2013/0007223 A1* | 1/2013 | Luby | H04N 21/23106 709/219 |

(Continued)

OTHER PUBLICATIONS

"Adobe Media Server family," Accessed at https://web.archive.org/web/20150617003049/http://www.adobe.com/products/adobe-media-server-family.html, Accessed on Jun. 24, 2015, pp. 2.
"Nelflix Open Connect," Accessed at https://openconnect.itp.netflix.com/, Accessed on Jun. 24, 2015, pp. 1.

(Continued)

*Primary Examiner* — John Schnurr

(57) ABSTRACT

Technologies are generally described for distribution of video over time-varying channels. A video processing module may encode a stream of video frames into a number of groups-of-pictures (GOPs), each GOP including multiple sub-groups-of-pictures (sub-GOPs) that may each be relatively self-contained. The video processing module may divide the encoded video frames into different blocks, and may assign different priorities to the different blocks based on how important the individual blocks are to the reconstruction of a sub-GOP, a GOP, or the stream of encoded video frames, including alternative blocks that make each sub-GOP entirely self-contained for the purpose of decoding in the event of severe losses of blocks from previous sub-GOPs. The video processing module may then provide the blocks to a client device based on the priority of the blocks, the connection quality of the client device, and occurrence of previous losses, for example.

17 Claims, 9 Drawing Sheets

(56) References Cited

U.S. PATENT DOCUMENTS

2015/0215133 A1\* 7/2015 Cao .................. H04L 65/607
370/312
2016/0330491 A1\* 11/2016 Yamagishi ........... H04N 21/236

OTHER PUBLICATIONS

"Smooth Streaming," Accessed at https://web.archive.org/web/20150318144300/http://www.iis.net/downloads/microsoft/smooth-streaming, Accessed on Jun. 24, 2015, pp. 2.

Lederer, S., et al., "Dynamic adaptive streaming over HTTP dataset," Proceedings of the 3rd Multimedia Systems Conference, pp. 89-94 (Feb. 22-24, 2012).

Müller, C., et al., "An Evaluation of Dynamic Adaptive Streaming over HTTP in Vehicular Environments," Accessed at https://web.archive.org/web/20131023223338/http://www.slideshare.net/christian.timmerer/an-evaluation-of-dynamic-adaptive-streaming-over-http-in-vehicular-environments, dated Feb. 24, 2012, pp. 5.

Pantos, R., and May, W., "HTTP Live Streaming draft-pantos-http-live-streaming-04," Accessed at https://web.archive.org/web/20150115162144/http://tools.ietf.org/html/draft-pantos-http-live-streaming-04, dated Jun. 5, 2010, pp. 22.

Roettgers, J., "To stream everywhere, Netflix encodes each movie 120 times," Accessed at https://web.archive.org/web/20150413061936/https://gigaom.com/2012/12/18/netflix-encoding/, dated Dec. 18, 2012, pp. 4.

Wenger, S., "H.264/AVC Over IP," IEEE Transactions on Circuits and Systems for Video Technology, vol. 13, No. 7, pp. 645-656 (Jul. 2003).

\* cited by examiner

COMPUTER PROGRAM PRODUCT 900

SIGNAL-BEARING MEDIUM 902

904 ONE OR MORE INSTRUCTIONS TO

GROUP A STREAM OF VIDEO FRAMES TO FORM ONE OR MORE GROUPS-OF-PICTURES (GOPs), EACH GOP INCLUDING MULTIPLE SUB-GROUPS-OF-PICTURES (SUB-GOPs);
ENCODE THE SUB-GOPs INTO MULTIPLE BLOCKS, EACH BLOCK INCLUDING AT LEAST A PORTION OF AN INDIVIDUAL ENCODED VIDEO FRAME;
ASSIGN A PRIORITY LEVEL TO EACH BLOCK BASED ON AN IMPORTANCE AND/OR A CONTEXT OF EACH BLOCK WITHIN AN ASSOCIATED SUB-GOP; AND
STORE AND/OR DISTRIBUTE THE BLOCKS BASED ON THE PRIORITY LEVEL ASSIGNED TO EACH BLOCK.

| COMPUTER-READABLE MEDIUM 906 | RECORDABLE MEDIUM 908 | COMMUNICATIONS MEDIUM 910 |

FIG. 9

VIDEO DISTRIBUTION, STORAGE, AND STREAMING OVER TIME-VARYING CHANNELS

BACKGROUND

Unless otherwise indicated herein, the materials described in this section are not prior art to the claims in this application and are not admitted to be prior art by inclusion in this section.

The increase in broadband availability has resulted in a commensurate increase in online streaming video, used for such applications as entertainment and communications. Video streaming is a relatively bandwidth-intensive activity, and as the resolution and quality of streamed video increases, the amount of bandwidth consumed by video streaming may likely increase significantly. However, the bandwidth and quality of individual broadband connections may vary across different users and different times. Accordingly, many schemes for providing streaming video continuity and quality across different connection types exist.

SUMMARY

The present disclosure generally describes techniques for video distribution, storage, and streaming over time-varying channels.

According to some examples, a method to provide video distribution, storage, and streaming over time-varying channels is described. The method may include grouping a stream of video frames to form one or more groups-of-pictures (GOPs), each GOP including multiple sub-groups-of-pictures (sub-GOPs), and encoding the multiple sub-GOPs of video frames into multiple blocks, where each block includes at least a portion of an individual encoded video frame. The method may further include assigning a priority level to each block in the multiple blocks based on an importance and/or a context of each block within an associated sub-GOP and storing and/or distributing the multiple blocks based on the priority level assigned to each block.

According to other examples, a content distribution network (CDN) to provide video distribution, storage, and streaming over time-varying channels is described. The CDN may include a content source, a video processing server, and an edge server. The content source may be configured to provide an encoded stream of video frames. The video processing server may be configured to receive the encoded stream of video frames, decode the encoded stream of video frames, and encode the decoded stream of video frames to form one or more groups-of-pictures (GOPs), each GOP including multiple sub-groups-of-pictures (sub-GOPs). The video processing server may be further configured to divide the stream of encoded video frames into multiple blocks, where each block includes at least a portion of an individual encoded video frame, and assign a priority level to each block in the multiple blocks based on an importance and/or context of each block within an associated sub-GOP. The edge server may be configured to store and/or distribute the encoded multiple blocks based on a priority level assigned to each block.

According to further examples, a client device to receive a video stream over time-varying channels is described. The client device may include a communication module, a display device, and a processor coupled to the communication module and the display device. The communication module may be configured to facilitate wired or wireless communication with an edge server of a content distribution network (CDN). The display device may be configured to display a received stream of encoded video frames organized into one or more groups-of-pictures (GOPs), each GOP including multiple sub-groups-of-pictures (sub-GOPs). The processor may be configured to maintain a manifest file that includes information associated with encoding rates and priority levels assigned to each block of multiple blocks, where the multiple blocks are generated from a division of the stream of encoded video frames into the multiple blocks. In some embodiments, each block may include at least a portion of an individual encoded video frame, and a priority level may be assigned to each block based on an importance and/or a context of each block within an associated sub-GOP. The processor may be further configured to select an encoding rate and one or more blocks for subsequent transmissions from the edge server based on a current quality of service, an occurrence of errors in reception, a transmission of previously requested blocks, and priority levels assigned to the one or more blocks in the subsequent transmissions. The processor may also be configured to transmit the selected encoding rate and information associated with a loss or an error in reception of blocks previously transmitted by the edge server for the subsequent transmissions to the edge server.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 9 illustrates a block diagram of an example computer program product, all arranged in accordance with at least some embodiments described herein.

DETAILED DESCRIPTION

Figure 1:
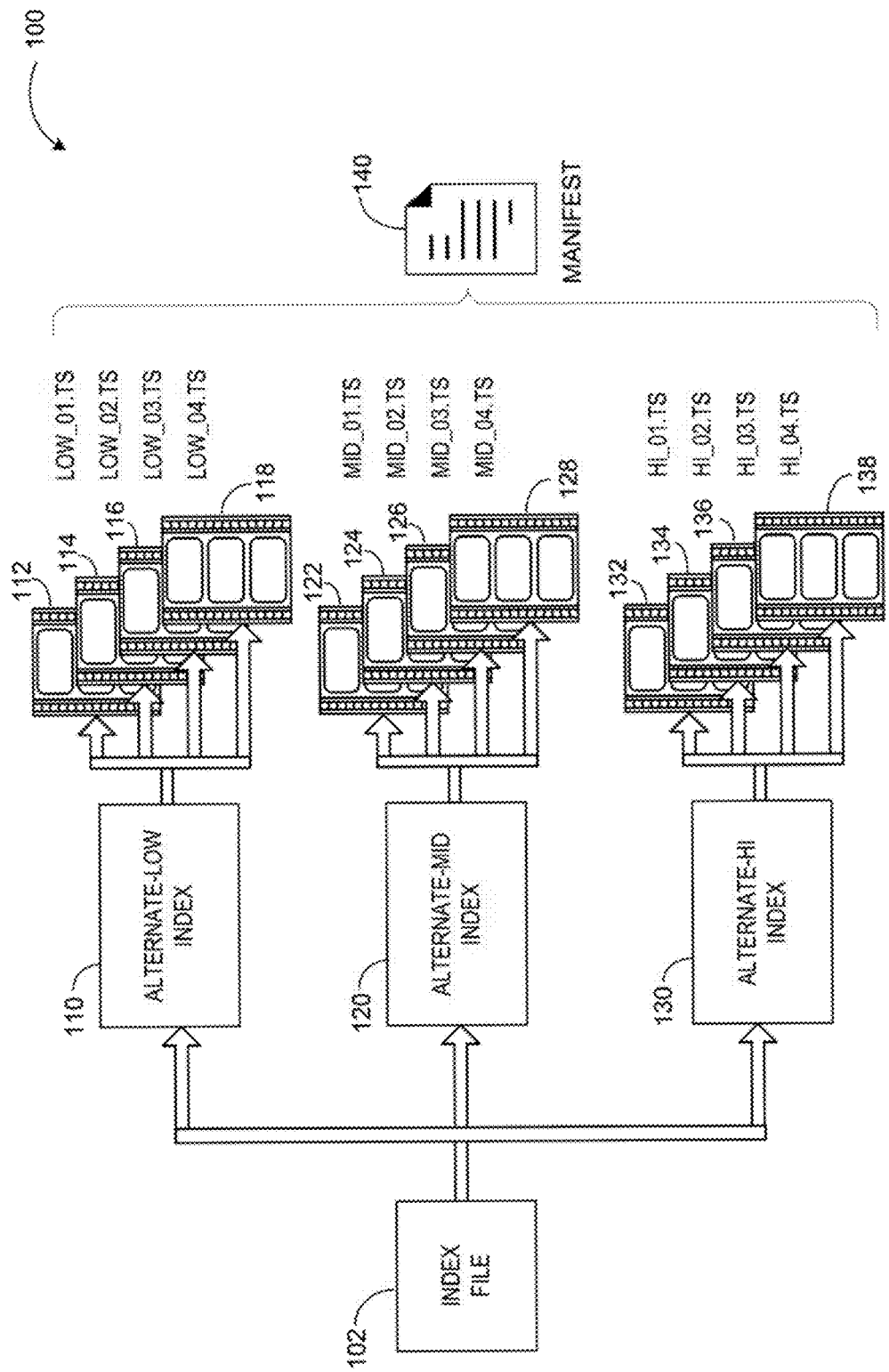
FIG. 1 illustrates an example of time-blocks of a video stream encoded into multiple encoded blocks at different bit rates.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, among other things, to methods, apparatus, systems, devices, and/or computer program products related to video distribution, storage, and streaming over time-varying channels.

Briefly stated, technologies are generally described for distribution of video over time-varying channels. A video processing module may encode a stream of video frames into a number of groups-of-pictures (GOPs), each GOP including multiple sub-groups-of-pictures (sub-GOPs) that may each be relatively self-contained. The video processing module may divide the encoded video frames into different blocks, and may assign different priorities to the different blocks based on how important the individual blocks are to the reconstruction of a sub-GOP, a GOP, or the stream of encoded video frames, including alternative blocks that make each sub-GOP entirely self-contained for the purpose of decoding in the event of severe losses of blocks from previous sub-GOPs. The video processing module may then provide the blocks to a client device based on the priority of the blocks, the connection quality of the client device, and occurrence of previous losses, for example.

FIG. 1 illustrates an example of time-blocks of a video stream encoded into multiple encoded blocks at different bit rates, arranged in accordance with at least some embodiments described herein.

Diagram 100 depicts how video content may be encoded, distributed, and streamed by a video processing system. The video processing system may first divide video content, in the form of an index file 102, into chunks based on time. The video processing system may then encode each time-chunk into multiple encoded time chunks, each having a different bitrate or quality and independently decodable. For example, the time-chunks associated with the index file 102 may be encoded into low-bitrate time-chunks 112-118 via a low-bitrate encoder 110, may be encoded into medium-bitrate time-chunks 122-128 via a mid-bitrate encoder 120, and may be encoded into high-bitrate time-chunks 132-138 via a high-bitrate encoder 130. The video processing system may also create a manifest 140 that describes the available time-bitrate chunks. The manifest and the different time-bitrate chunks may then be distributed to and stored at one or more servers or caches for transmission to client devices. When a client device plays a video, the client device may determine its connection quality and request the highest bitrate chunk that the connection can handle.

Figure 2:
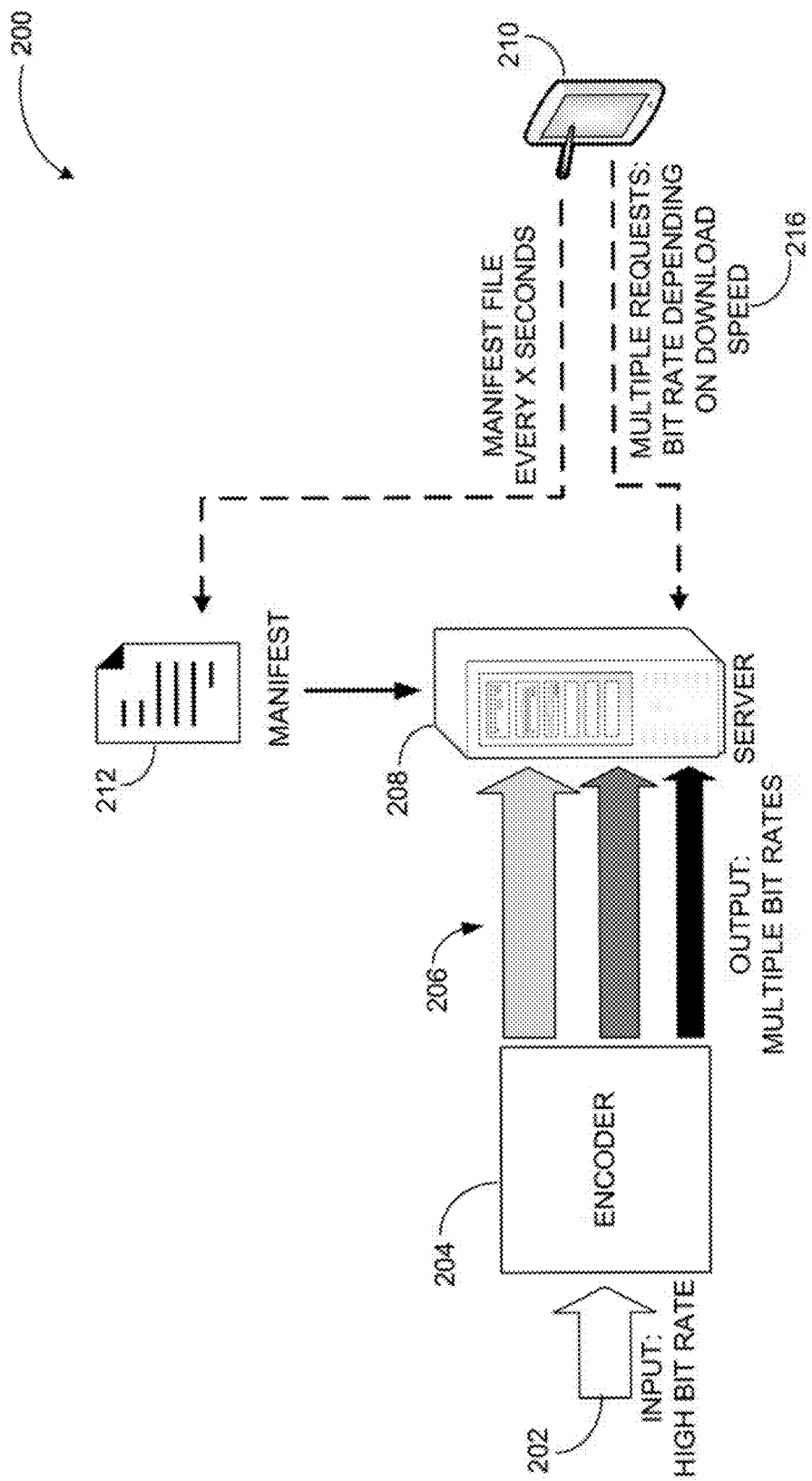
FIG. 2 illustrates an overview of an example adaptive video streaming system.

FIG. 2 illustrates an overview 200 of an example adaptive video streaming system, arranged in accordance with at least some embodiments described herein.

According to the overview 200, video content 202 may be encoded into multiple versions 206, each version having a different bitrate, by an encoder 204, as described above in FIG. 1. The multiple versions 206 may then be provided to a server 208 that may be configured to store and distribute video content to client devices. When a client device 210 plays a video, it may periodically receive a manifest 212 (similar to the manifest 140) or updates to the manifest 212 from the server 208 that describes the available versions 206. The client device 210 may make requests 216 to the server 208 for different bitrate versions of the multiple versions 206, based on the quality of the connection between the client device 210 and the server 208, or based on non-receipt of certain blocks from among multiple versions 206 that were previously requested by client device 210. For example, if connection quality is relatively good, resulting in relatively high data transmission rates, the client device 210 may request higher-bitrate versions of the multiple versions 206. On the other hand, if connection quality is relatively poor, resulting in relatively low transmission rates, the client device 210 may request lower-bitrate versions of the multiple versions 206. In another example, if the client device 210 receives so few blocks from the first sub-GOP of a GOP that there is relatively high potential for error propagation into the next sub-GOP of the same GOP, then the client device 210 may request the alternatively encoded I-frame version of the beginning frame of the next sub-GOP.

In some embodiments, when the transmission rate to the client device 210 exceeds the video encoding bitrate, the client device 210 may download and store additional video content in a buffer. If connection quality degrades, the client device 210 may begin playing the buffered video content. At some point, based on rate-decision algorithms and/or buffer drain rate, the client device 210 may reduce the video playback bitrate and request lower-bitrate versions of the multiple versions 206. When connection quality improves and transmission rates increase, the client device 210 may again begin filling its buffer as described, and the client device may increase the video playback bitrate and request higher-bitrate versions of the multiple versions 206.

Figure 3:
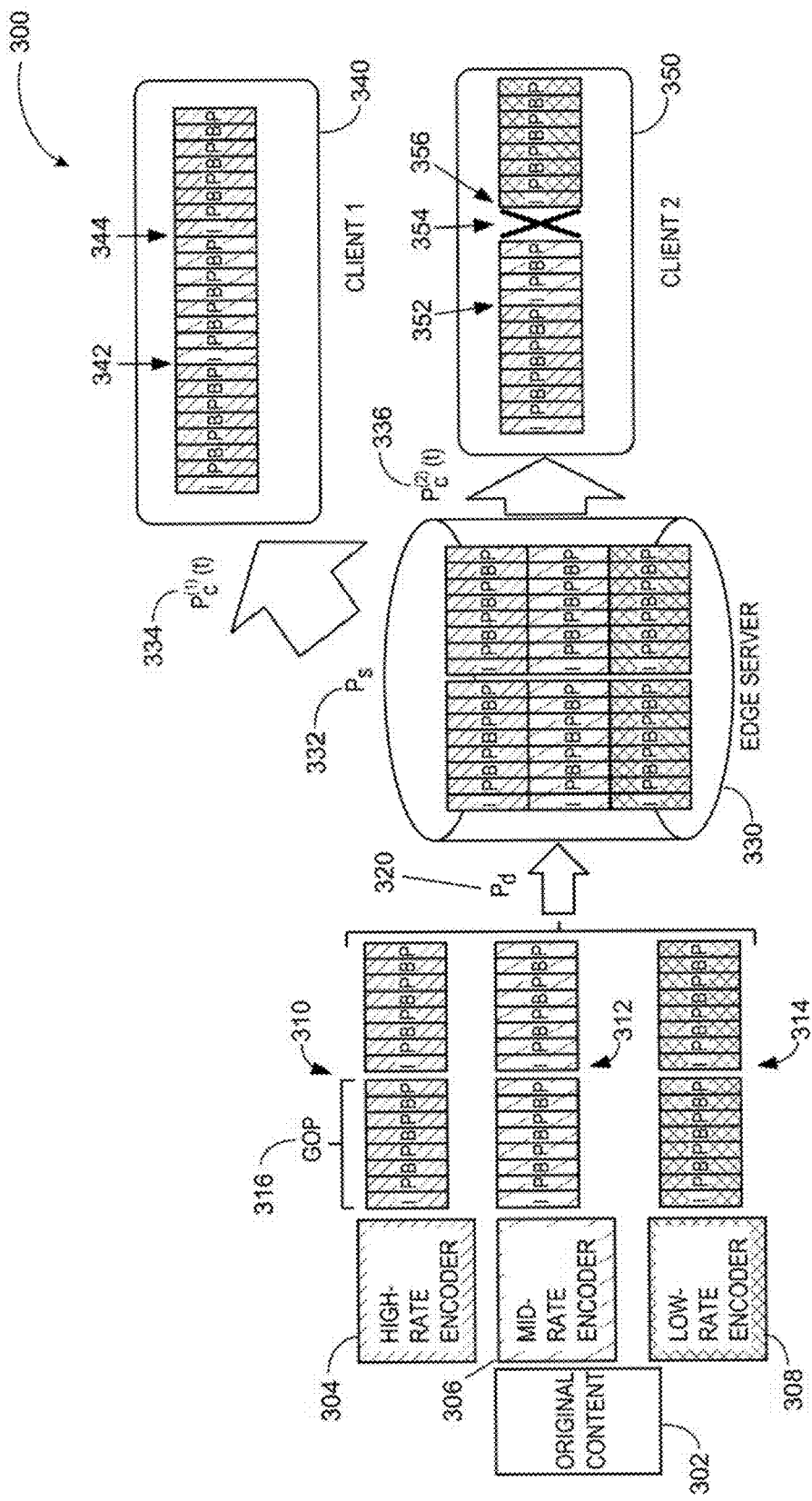
FIG. 3 illustrates an overview of an example video encoding, distribution, streaming, and loss model.

FIG. 3 illustrates an overview 300 of an example video encoding, distribution, streaming, and loss model.

According to the overview 300, original content 302 (similar to video content 202), may be encoded into different bitrate video content by a high-rate encoder 304, a mid-rate encoder 306, and a low-rate encoder 308. For example, the high-rate encoder 304 may encode the original content 302 into high-bitrate video content 310, the mid-rate encoder 306 may encode the original content 302 into mid-bitrate video content 312, and the low-rate encoder 308 may encode the original content 302 into low-bitrate video content 314. In some examples, the original content may first be divided into a number of groups-of-pictures (GOPs) before or during encoding. For example, the high-bitrate video content 310 may include one or more GOPs 316. A GOP may be a time-chunk, as described above in FIG. 1, and may represent a series of contiguous pictures or frames in the video content. For example, a GOP may begin with an intra-coded picture (referred to as an "I-frame"), which encodes frame data without using references to other frames. The GOP may further include one or more P-frames (also known as "predicted picture") and/or B-frames (also known as "bi-predictive pictures) that encode frame data based on one or more previous frames (P-frame) or based on previous and future frames (B-frame). In some examples, all of the high, mid, and low-bit rate video content 310-314 may be divided into GOPs along substantially the same boundaries. For example, a GOP of the high-bitrate video content 310 may have corresponding GOPs in the mid-bitrate video content 312 and the low-bitrate video content 314, and all of the corresponding GOPs may represent the same series of contiguous pictures or frames.

In a further example, the different frames may be encoded in such a way that it may be possible to partition the frames into blocks of different priority levels such that the clients 340 and 350 may be able to at least partially decode the encoded frames from the blocks as long as the blocks are received along with other blocks corresponding to priorities higher than a current block. In another example, each GOP may be divided into two or more sub-GOP, and certain frames, for example, the P-frames that start the second or subsequent sub-GOP(s) may be alternatively encoded in the form of a lower fidelity I-frame and stored as an alternative block with a different priority level—to be transmitted if requested by the clients 340 and 350.

The high, mid, and low-bit rate video content 310-314 may then be provided to an edge server 330. In some embodiments, there may be a transfer loss probability $P_d$ 320 associated with the provision of the video content 310-314 to the edge server 330, which may represent the probability that one or more GOPs or frames are lost during transmission to the edge server 330. $P_d$ 320 may be related to the quality of the content delivery network used to provide the video content 310-314 to the edge server 330. In an example implementation, CDNs with different level of reliability may be used to transfer blocks of different probabilities to the edge servers, resulting in different levels of $P_d$ 320 for the different priority levels.

The edge server 330 in turn may store the video content 310-314 for streaming to requesting client devices. In some embodiments, the edge server 330 may have an associated stored-data-loss probability $P_S$ 332, which may represent the probability that one or more stored GOPs or frames may be lost. $P_S$ 332 may be related to the type of storage used by the edge server 330 to store the video content 310-314. For example, the edge server 330 may store the video content 310-314 in spinning disc storage or solid-state storage, which may have different probabilities of data loss. In another example, there may be different types of storage, for example, solid-state memory with different levels of error-correction-coding (ECC), with different storage loss levels $P_S$ 332 that may be simultaneously used to store the encoded streams (video content 310, 312, and 314). In such an example, the encoded blocks with higher priority levels, regardless of the bitrate level they result from, may be stored in the type of storage with lower $P_S$ 332, and blocks with lower priority levels may be stored in the type of storage with higher $P_S$ 332.

At some point, the edge server 330 may stream the video content 310-314 to a first client 340 and a second client 350 in response to their requests. Data transmitted to the first client 340 and the second client 350 may suffer from bit loss during transmission, and the bit loss may be associated with the quality of the network connection between the edge server 330 and the first client 340 or the second client 350. For example, data transmitted to the first client 340 from the edge server 330 may suffer bit loss according to a first bit loss probability $P_C^{(1)}$ 334 as a function of time, and data transmitted to the second client 350 from the edge server 330 may suffer bit loss according to a second bit loss probability $P_C^{(2)}$ 336 as a function of time.

Consider the first client 340. Initially, the transmission rate of the connection between the edge server 330 and the first client 340 may be sufficient for the edge server 330 to provide GOPs from the high-bitrate video content 310 to the first client 340. Suppose then that the connection quality degrades according to the first bit loss probability $P_C^{(1)}$ 334. At time 342, the first client 340 may then request GOPs from the mid-bitrate video content 312, which the edge server 330 may provide and the first client 340 may display. Subsequently, the connection quality may improve, and at time 344 the first client 340 may request GOPs from the high-bitrate video content 310. In the latter case, the first client 340 may be able to display video content without interruption.

Now consider the second client 350. Initially, the transmission rate of the connection between the edge server 330 and the second client 350 may be sufficient for the edge server 330 to provide GOPs from the high-bitrate video content 310 to the second client 350. Suppose then that the connection quality degrades according to the second bit loss probability $P_C^{(2)}$ 336, which may be greater than the first bit loss probability $P_C^{(1)}$ 334. At time 352, the second client 350 may then request GOPs from the mid-bitrate video content 312, which the edge server 330 may begin to provide. Subsequently, the connection quality may continue to degrade, and the second client 350 may not be able to receive the mid-bitrate video content 312 sufficiently quickly, resulting in a video discontinuity (for example, a skip) at time 354. The second client 350 may then begin to request GOPs from the low-bitrate video content 314, which the edge server 330 may provide at time 356.

In some embodiments, a video encoding, distribution, and streaming system such as that described in FIG. 3 may be modified to reduce bandwidth usage and the probability of video discontinuities due to data loss. Such modifications may be based on several different concepts.

Not all portions of an encoded video frame may be equally important for delivery of the final video. Errors in some encoded portions may cause error propagation beyond the current frame, while errors in other encoded portions may be localized to the current frame. Moreover, localized errors may range from relatively severe visual artifacts to less visible artifacts. To mitigate localized errors, error-resiliency techniques may be used to create separate video transmission packets (for example, video coding layer or network abstraction layer packets) that contain video data chunks at different priority levels. As a result, even if one or more lower-priority video data chunks are lost, a client may still have enough video data to produce a functionally complete picture with some localized error degradation.

Moreover, it may be possible to use a variety of storage and transmission techniques, coupled with client adaptation techniques, to create different quality of service (QoS) for transferring video data chunks of different priorities such that an aggregate loss probability, $$P_{LOSS} = 1 - (1-P_d)(1-P_S)(1-P_C),$$

where $P_d$ may represent a transfer loss probability associated with a content distribution network path, $P_S$ may represent a stored-data-loss probability associated with a storage type, and $P_C$ may represent a bit loss probability associated with a time-varying transfer channel, as described above, is smaller for higher-priority chunks and larger for lower-priority chunks. For example, solid-state storage drives that have been previously written to several times may have a higher storage bit-error-rate compared to solid-state storage drives that have not been written to many times, or compared to spinning disc storage drives. Accordingly, higher-priority chunks may be stored in storage devices with lower bit-error-rates $P_S$, and vice-versa. In addition, when the encoded data are distributed to the streaming server, there may be different content distribution network choices, where some have lower cost but provide lower guarantees of delivery (1−Pd) in their service level agreements, and vice-versa. Accordingly, based on the desired QoS, higher-priority data chunks may be delivered over links with relatively better service level agreements, and vice-versa.

Furthermore, it may be possible to handle data loss in a relatively granular fashion. For example, if data chunks lost during transmission to a client can be identified, and the mapping of those lost data chunks on the final picture can be determined, then an edge server or some other controller may determine whether to re-transmit some or all of the lost data chunks, ignore the error, send an alternative data chunk that encodes some of the lost or error-propagated frame without dependence on previously encoded frames (i.e. as an I-frame), and/or replace some data chunks scheduled to be transmitted with data chunks specially encoded to avoid error-propagation due to the lost data. In some embodiments, these specially-encoded data chunks may be created ahead of time and stored at edge servers, created at the edge servers before commencement of video streaming, and/or created at the edge servers in real time in response to a client request and/or server determination that data chunks have been lost.

The error-reduction techniques described above may reduce the need for I-frames, allowing individual GOPs to be larger. Larger GOPs may reduce bitrate requirements and improve quality, because I-frames may be particularly larger as compared to P-frames or B-frames.

Figure 4:
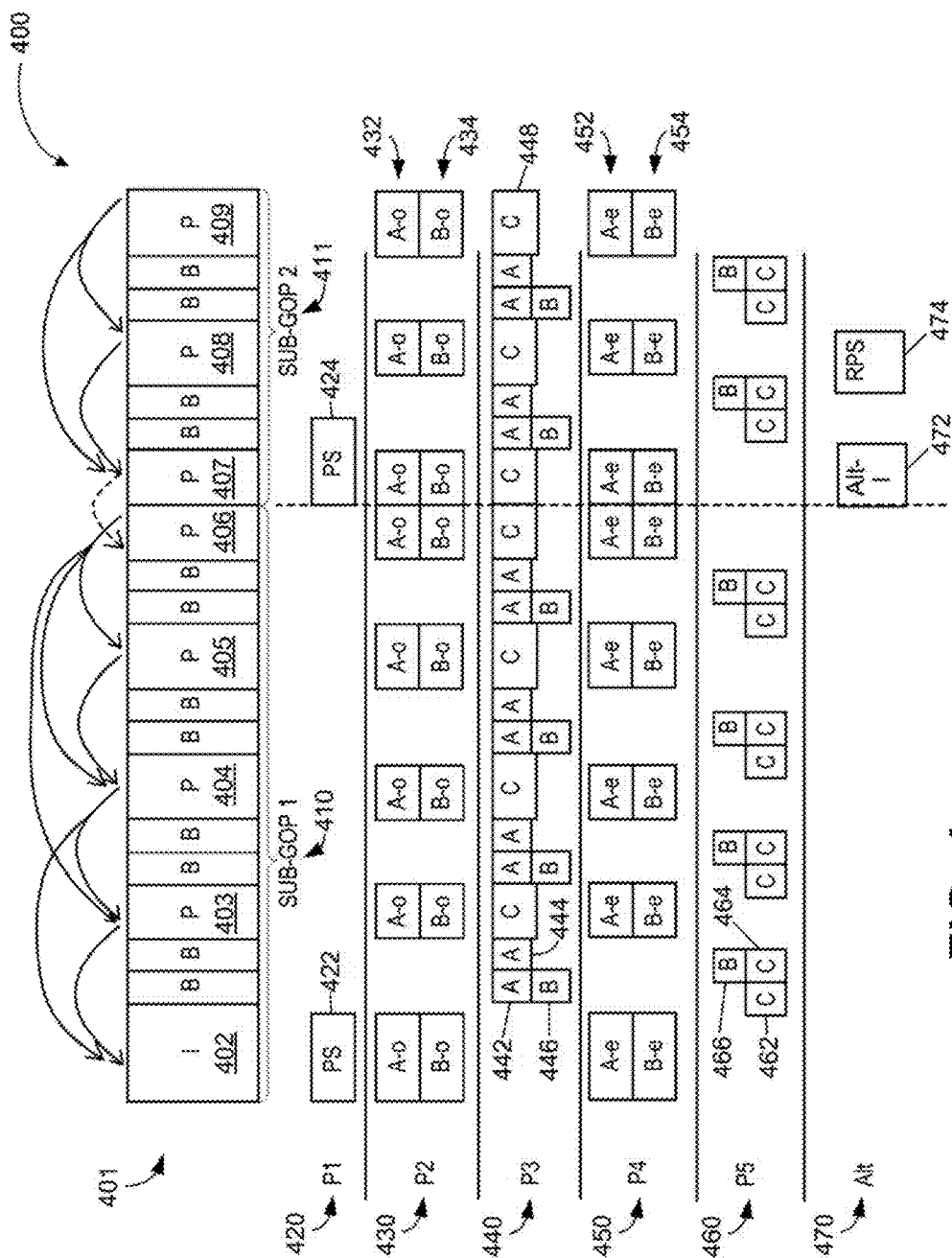
FIG. 4 illustrates an example encoding scheme for a given bit rate.

FIG. 4 illustrates an example encoding scheme 400 for a given bit rate, arranged in accordance with at least some embodiments described herein.

According to the encoding scheme 400, which may be performed by an encoder or a video processing module, video data 401 may be encoded to have different priority levels and to reduce the number of I-frames, as described above. The encoder may encode the video data 401 as one or more groups-of-pictures (GOPs), each of which may include an I-frame, one or more P-frames, and one or more B-frames. For example, the encoder may encode the video data 401 as a GOP that includes an I-frame 402, P-frames 403-409, and a number of B-frames. The encoder may further subdivide the video data 401 into at least two sub-groups-of-pictures (sub-GOPs) 410 and 411. In some embodiments, the encoder may encode the video data 401 so as to include at least one set of two consecutive P-frames (for example, the P-frames 406 and 407), and the encoder may subdivide the video data 401 into sub-GOPs at the at least one set of two consecutive P-frames such that each sub-GOP ends with a P-frame and each sub-GOP not at the beginning of a GOP (for example, the sub-GOP 411) begins with a P-frame.

In some embodiments, the encoder may first create a picture parameter set (PS) that describes how the video data 401 is encoded. The encoder may encode the same PS in each of the sub-GOPs in the video data 401. For example, the encoder may encode a PS 422 for the sub-GOP 410 and a PS 424 for the sub-GOP 411, where both the PS 422 and the PS 424 encode the same information. In some embodiments, the encoder may assign the data chunks containing the PS 422 and 424 to the highest priority level, priority 1 (P1) 420.

The encoder may then use flexible macroblock ordering to generate two slices for every frame in an alternate odd-even checker-board fashion. Flexible macroblock ordering may be performed to ensure that if one of the macroblock sets are missing then intra-picture recovery can extrapolate from the remaining macroblock set. The encoder may then encode these "even" and "odd" slices separately, with both spatial and temporal separation.

Subsequently, the encoder may then code the macroblocks within the slices using data partitioning to create three partitions, denoted as "A", "B", and "C" partitions. The "A" partition may store header information, such as macroblock type, quantization parameters, motion vectors, and other suitable information. The "B" partition may store intra-frame coded-block-patterns (CBPs) that indicate coefficient presence information for the macroblocks, intra-frame coefficient data for the macroblocks, and other suitable intra-frame coefficient information. The "C" partition may store inter-frame CBPs, inter-frame coefficient data, and other suitable inter-frame coefficient information.

In some embodiments, the encoder may encode the P-frame 407, which leads sub-GOP 2 411, by referring to the immediately preceding P-frame 406. Remaining frames in sub-GOP 2 411 may be encoded in a way such that they do not refer to any frame not included in sub-GOP 2 411. In addition, the encoder may create a redundant slice version of the P-frame 407 as a relatively low bitrate (in other words, relatively highly quantized) I-frame. This I-frame, similar to the I-frame 402, may serve as a recovery frame for the sub-GOP 2 411 that allows frames in the sub-GOP to be derived independently of other sub-GOPs. The encoder may further create B-frames in the video data 401 in pairs of two, and may refer to the P-frames on either side of the pair within the same sub-GOP but such B-frames may not refer to P-frames outside of the sub-GOPs they are in.

In other embodiments, the encoder may encode a non-leading P-frame in a subsequent sub-GOP to refer to P-frames across sub-GOP boundaries. In this situation, the encoder may further create a redundant slice representation of P-frames having references across sub-GOP boundaries in a reference picture selected (RPS) form. When specified in the RPS form, a P-frame may only reference other P-frames preceding it in the same sub-GOP. For example, the encoder may encode the P-frame 409 to refer to one or more of the P-frames 403-406. The encoder may further encode an RPS form of P-frame 409 that only refers to P-frame 408.

The encoder may then create data chunks based on the encoded frames and assign priorities to the data chunks. The encoder may first encode "A" and "B" partitions of the odd slices of the I- and P-frames in the video data 401 (for example, the I-frame 402 and the P-frames 403-409) into "A-o" chunks 432 and "B-o" chunks 434, respectively, and designate the chunks 432 and 434 as priority 2 (P2) 430.

The encoder may encode the "A" partitions of all B-frames in the video data 401 into chunks 442 and 444, the "B" partitions of the first-occurring B-frame in a pair into chunks 446, and the C-partitions of both the even and odd slices of the P-frames in the video data 401 (for example, the P-frames 403-409) as chunks 448. The chunks 442, 444, 446, and 448 may then be designated as priority 3 (P3) 440.

The encoder may encode the "A" and "B" partitions of the even slice of the I- and P-frames in the video data 401 (for example, the I-frame 402 and the P-frames 403-409) into "A-e" chunks 452 and "B-e" chunks 454, respectively, and designate the chunks 452 and 454 as priority 4 (P4) 450.

The encoder may then encode the "C" partitions of all B-frames in the video data 401 as chunks 462 and 464, and may encode the "B" partitions of the last-occurring B-frame in a pair into chunks 466. The chunks 462-466 may be designated as priority 5 (P5) 460.

The encoder may also encode the redundant slice version, that is, a lower fidelity I-frame form, of a P-frame that leads a sub-GOP (for example, the P-frame 407) into a chunk 472, which may be designated as an Alt-I chunk 470. In situations where non-leading P-frames may refer to other P-frames across sub-GOP boundaries, the encoder may encode an RPS form chunk 474, as described above. The Alt-I chunk 470 and the RPS form chunk 474 may be designated as alternative priority (Alt) 470.

While in the diagram 400 the data chunks of the video data 401 have six different priority designations, in other embodiments video data chunks may have more or fewer priority designations. In one embodiment, adjacent priority levels may be combined to form new priority levels. For example, chunks originally designated P1 420 and P2 430 may together be designated as new P1 chunks, chunks originally designated P3 440 and P4 450 may together be designated as new P2 chunks, and chunks originally designated P5 460 may be designated as new P3 chunks. In further embodiments, the chunks that are assigned certain priority levels may be rearranged into different priority levels. For example, the priority levels P2 430 and P4 450 may be swapped without loss in functionality such that chucks in P4 450 can now be designated priority level P2 and chunks in P2 430 can now be designated priority level P4. In yet other embodiments, the chunks that were combined together may be split and re-combined with chunks belonging to different priority levels to recreate a different priority level. For example, chunks 466 may be split from priority level P5 460 and instead inserted into priority level P4 450, while the new priority level P5 460 may contain the chunks 462 and 464. It should be noted, as discussed herein, the chunks belonging to the same sub-GOP and same priority level may be considered together as an atomic quantity for the purpose of transport across a CDN, storage in the edge servers, and transmission across a channel to the client device(s)—hence constituting what is referred to as "blocks" above.

Figure 5:
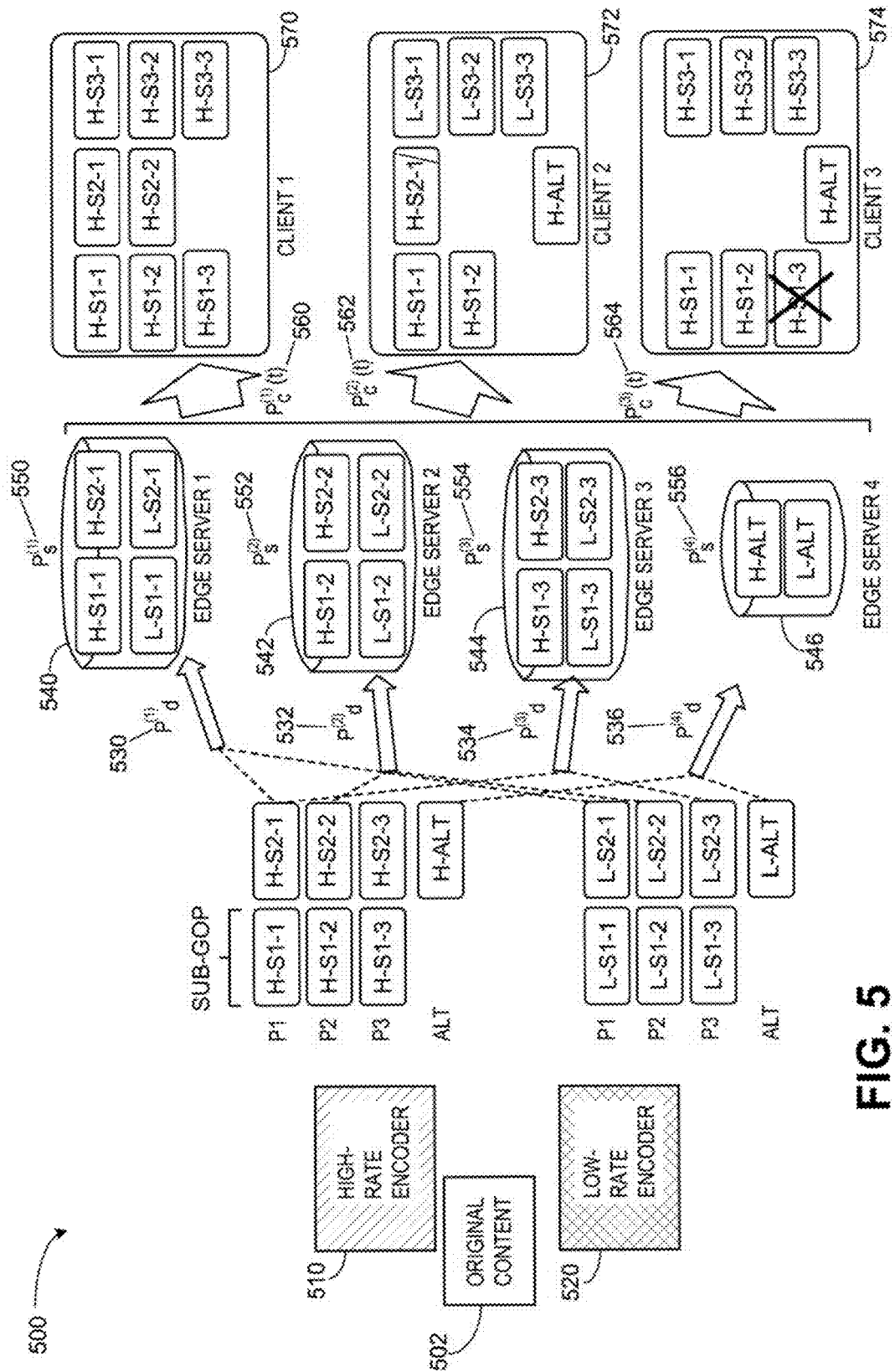
FIG. 5 illustrates an example model for adaptive video streaming to clients.

FIG. 5 illustrates an example model for adaptive video streaming to clients, arranged in accordance with at least some embodiments described herein.

Diagram 500 depicts an example of how the prioritized video data chunks described above in FIG. 4 may be distributed to edge servers and clients. In the diagram 500, original video content 502 may be encoded into two different bitrates. A high-rate encoder 510 may encode the original video content 502 into relatively-high-bitrate video chunks, and a low-rate encoder 520 may encode the original video content 502 into relatively-low-bitrate video chunks. The encoded video chunks may be grouped into sub-GOPs as shown, where a particular sub-GOP includes multiple data portions organized into four different priority levels, denoted as P1, P2, P3, and ALT. For illustrative purposes, each data portion in the diagram 400 is labeled to indicate its encoding rate, the sub-GOP it belongs to, and its priority. For example, the data portion of the relatively-low-bitrate video data that is positioned top rightmost is labeled "L-S2-1", indicating that it is low bitrate (L), belongs to the second sub-GOP (S2), and is designated priority 1 (1). Each of these data portions may be considered together as an atomic quantity for the purpose of transport across a CDN, storage in the edge servers, and transmission across a channel to the client device(s)—hence constituting what is referred to as "blocks" above.

The various data portions may then be stored at a number of edge servers 540, 542, 544, and 546. Each of the edge servers 540-546 may have an associated transfer loss probability $P_d$ related to the content distribution network paths by which content is provided to the edge servers 540-546, and a stored-data-loss probability $P_S$ associated with the storage type(s) available at the edge servers 540-546, as described above. For example, the edge server 540 may have a $P_d^{(1)}$ 530 and a $P_S^{(1)}$ 550, the edge server 542 may have a $P_d^{(2)}$ 532 and a $P_S^{(2)}$ 552, the edge server 544 may have a $P_d^{(3)}$ 534 and a $P_S^{(3)}$ 554, and the edge server 546 may have a $P_d^{(4)}$ 536 and a $P_S^{(4)}$ 556. In some embodiments, the edge servers 540-544 may be configured such that higher-priority chunks are stored at edge servers with lower loss probabilities. For example, P1 data may be stored at edge server 540, which may have relatively low loss probabilities $P_d^{(1)}$ 530 and $P_S^{(1)}$ 550. P2 data may then be stored at edge server 542, which may have loss probabilities $P_d^{(2)}$ 532 and a $P_S^{(2)}$ 552 higher than $P_d^{(1)}$ 530 and $P_S^{(1)}$ 550, respectively. P3 data may then be stored at edge server 544 which may have loss probabilities $P_d^{(3)}$ 534 and $P_S^{(3)}$ 554 higher than $P_d^{(2)}$ 532 and a $P_S^{(2)}$ 552. Accordingly, higher-priority data may have lower loss probabilities.

A number of clients 570, 572, and 574 may request video data from the edge servers 540-546. Each of the clients may have an associated bit loss probability that may itself vary over time, as described above in FIG. 3. For example, the client 570 may have a bit loss probability $P_C^{(1)}(t)$ 560 at time instant "t", the client 572 may have a bit loss probability $P_C^{(2)}(t)$ 562 at time instant "t", and the client 574 may have a bit loss probability $P_C^{(3)}(t)$ 564 at time instant "t". In the example depicted in the diagram 500, $P_C^{(1)}(t)$ 560 may be similar to $P_C^{(1)}(t)$ 334 in FIG. 3, and $P_C^{(2)}(t)$ 562 may be similar to $P_C^{(2)}(t)$ 336 in FIG. 3.

In one example, the client 570 may request the P1, P2, and P3 chunks of the first high-bitrate sub-GOP, labeled H-S1-1, H-S1-2, and H-S1-3, respectively. While receiving the requested chunks, the bit loss probability $P_C^{(1)}(t)$ 560 may degrade, similar to the degradation of $P_C^{(1)}(t)$ 334 described in FIG. 3. Upon detecting the degradation, the client 570 may determine that it may not be able to receive all of the chunks of the second high-bitrate sub-GOP but may not have to switch to the low-bitrate version. Accordingly, the client 570 may request only the P1 and P2 chunks of the second high-bitrate sub-GOP, labeled H-S2-1 and H-S2-2, respectively, thus forgoing the P3 chunk H-S2-3 for the second high-bitrate sub-GOP. The data contained in H-S2-1 and H-S2-2 may be sufficient for the client 570 to reconstruct the video (for example, using interpolation) without H-S2-3, and may provide quality better than the mid-bitrate video content 312 in FIG. 3. While receiving the requested chunks, the bit loss probability $P_C^{(1)}(t)$ 560 may improve sufficiently (similar to the bit loss probability $P_C^{(1)}(t)$ 334 in FIG. 3) such that the client 570 can request and receive the P1, P2, and P3 chunks of the third high-bitrate sub-GOP, labeled H-S3-1, H-S3-2, and H-S3-3. It should be noted that the time-variance of the transmission channel may be similar to the "temporary dip" scenario outlined for Client 1 340 in FIG. 3.

In another example, the client 572 may also request the H-S1-1 and H-S1-2 chunks. However, sometime while receiving the chunks, the bit loss probability $P_C^{(2)}(t)$ 562 may degrade, similar to the bit loss probability $P_C^{(2)}(t)$ 336 in FIG. 3, such that the client 572 may not be able to receive the H-S1-3 chunks in time. In response, the client 572 may either abort a pending request for the H-S1-3 chunks or not request the H-S1-3 chunks at all. Subsequently, the client 572 may determine that it should only request the H-S2-1 chunks, which are the highest priority chunks for the second high-bitrate sub-GOP. However, suppose that the H-S2-1 chunks also do not arrive in time due to further degradation of bit loss probability $P_C^{(2)}(t)$ 562. At this point, the client 572 may determine that it should request the H-ALT chunks, which are the alternate chunks of the second high-bitrate sub-GOP. The client 572 may be able to use the H-ALT chunks to generate a picture that is of lower quality than the mid-bitrate video content 312 in FIG. 3, but better than the video "skip" discontinuity that resulted in FIG. 3 when the second client 350 could not receive the mid-bitrate video content 312. Subsequently, the client 572 may request the P1, P2, and P3 chunks of the low-bitrate third sub-GOP, labeled L-S3-1, L-S3-2, and L-S3-3, due to the degraded bit loss probability $P_C^{(2)}(t)$ 562, which may correspond to the low-bitrate video content 314 in FIG. 3.

In yet another example, the client 574 may initially request the H-S1-1, H-S1-2, and H-S1-3 chunks. The bit loss probability $P_C^{(3)}(t)$ 564 may not degrade, and data transmitted between the edge servers 540-546 to the client 574 may not be lost. However, suppose that errors are present in the H-S1-3 chunks, because of data loss due to storage (for example, based on the stored-data-loss probability $P_S^{(3)}$ 554) and/or transmission to the edge server 544 (for example, based on the transfer loss probability $P_d^{(3)}$ 534). In this situation, the client 574 may receive an error message (for example, from the edge server 544) upon requesting the H-S1-3 chunks. In response, the client 574 may request the H-ALT chunks from the edge server 546, which turns out to be error-free, and as a result the client 574 may be able to continue to display the video data without any video discontinuities.

In some embodiments, if the time-varying transfer channels between the edge servers 540-546 and the clients 570-574 are resolvable into logically parallel channels with different QoS, higher-priority data chunks may be transferred to clients over delivery channels with higher QoS, and lower-priority data chunks may be transferred to clients over delivery channels with lower QoS.

The data chunk transfer process described herein may be performed over Hypertext Transfer Protocol (HTTP). In some embodiments, the transfer process may use Real-time Transport Protocol (RTP) over HTTP, RTP over micro Transport Protocol (µTP), MPEG transport stream (MPEG-TS), MPEG-TS over Internet Protocol (IP), or any other transfer protocol with chunked transfer capability.

While the video transfer process is described herein in the context of pre-stored video data, the video transfer process may also be applicable to other situations. Such situations may include near real-time streaming video (for example, webcasts or surveillance video), hard real-time conversational video (for example, video calls or video conferences), broadcast or multicast video with unicast augmentation, wireless display or screen sharing applications over any suitable protocol, storage-and-retrieval of video data from an error-prone storage device, and/or any other suitable application.

In some embodiments, the determination of the appropriate chunks to provide to a client may be performed by one or more of the edge servers. For example, the manifest describing the chunks of different rates, priorities, and alternative chunks (for example, the manifest 212) may be stored at the edge server. The client may make sequential chunk requests, the edge server may know whether and when the chunks it provided was successfully received by the client, and the edge server may determine whether alternative and/or lower-priority chunks should be provided to the client in response to the client requests. For example, the edge server may receive an indication that one or more chunks was lost during delivery to the client, and may select alternative chunks and/or different transmission rates for subsequent transmission to the client. In some embodiments, the encoding and generation of the data chunks as described above in FIG. 4 may occur at the edge servers instead of at a centralized encoder system. For example, the data chunks may be encoded before video streaming, or may be encoded in real-time as the video is being streamed.

Figure 6:
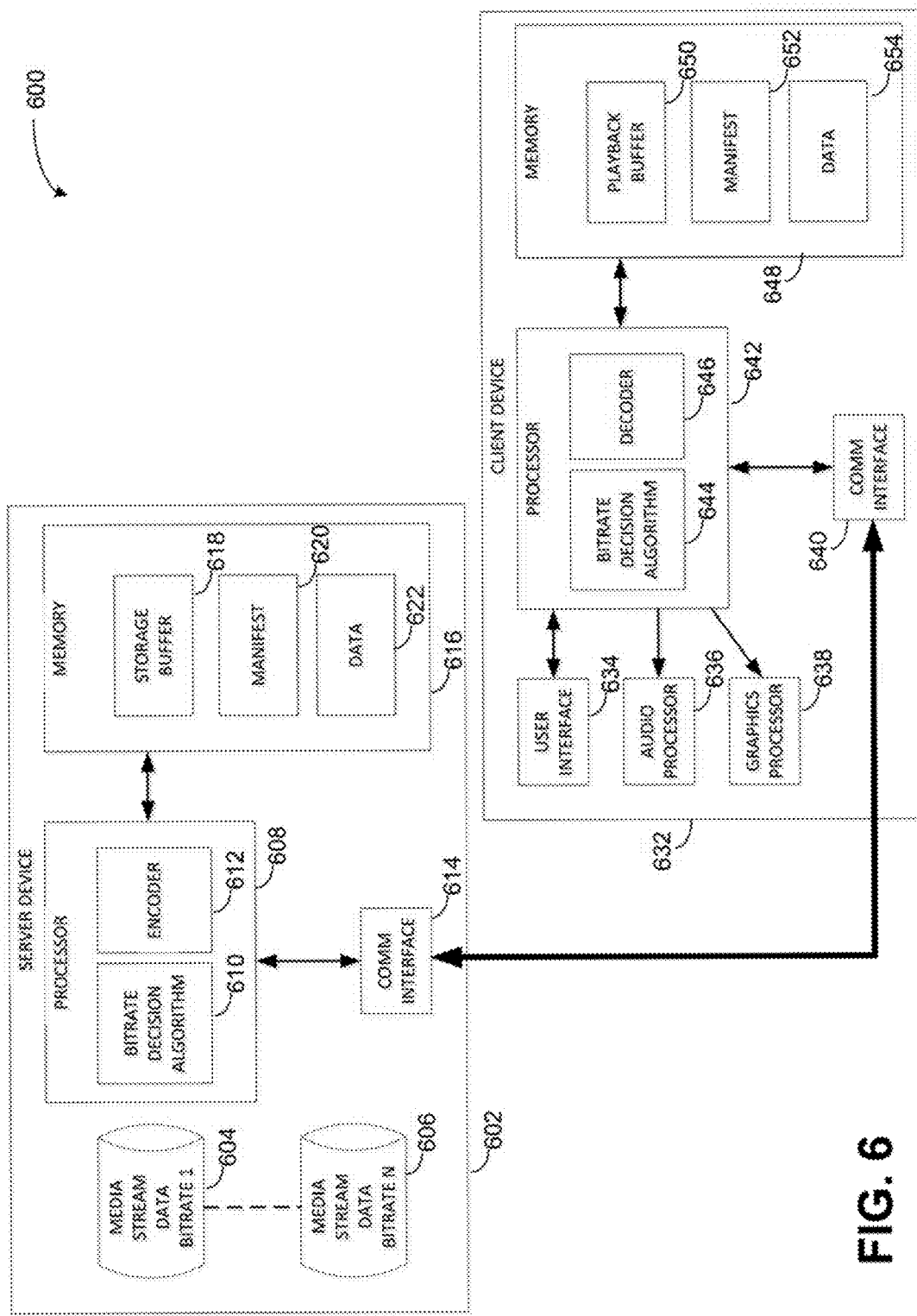
FIG. 6 illustrates an example server-client architecture, which may be associated with video distribution, storage, and streaming over time-varying channels.

FIG. 6 illustrates an example server-client architecture, which may be associated with video distribution, storage, and streaming over time-varying channels, arranged in accordance with at least some embodiments described herein.

As shown in diagram 600, an example server-client architecture may include a server device 602, which may include a processor 608, a memory 616, and a communication interface 614. The processor 608 may include an encoder 612 and execute a bitrate decision algorithm 610. The memory 616 may include a storage buffer 618 and store manifest 620 and data 622. The server device 602 may further store and/or manage media streams at various bitrates such as media stream data for bitrate 1 604 through media stream data for bitrate N 606.

An example client device 632 may include a processor 642, a memory 648 and a communication interface 640, which may facilitate exchange of communications including receipt of media stream(s) from the corresponding communication interface 614 at the server device 602. The client device 642 may further include user interface 634, audio processor 636, and graphics processor 638. The processor 642 may include a decoder 646 and execute bitrate decision algorithm 644. The memory 648 may include a playback buffer 650 and store the manifest 652 and data 654.

Video content may be encoded into multiple versions, each version having a different bitrate, by the encoder 612 at the server device 603. One or more of the multiple versions (media stream data for bitrate 604 through media stream data for bitrate N 606) may then be provided to the client device 632. When the client device 632 plays a video, it may periodically receive the manifest 620 or updates to the manifest 652 already stored at the client device 632 from the server device 602, where the manifest(s) describes the available versions of the video content at different bitrates.

The client device 632 may send requests to the server device 602 for different bitrate versions of the media stream, based on the quality of the connection between the client device 632 and the server device 602. In some examples, when the transmission rate to the client device 632 exceeds the video playback bitrate, the client device 632 may download and store additional video content in the playback buffer 650. If connection quality degrades, the client device 632 may begin playing the buffered video content. At some point, based on the bitrate decision algorithm 644 and/or buffer drain rate, the client device 632 may reduce the video playback bitrate and request lower-bitrate versions of the media stream. When connection quality improves and transmission rates increase, the client device 632 may again begin filling its playback buffer 650 as described, and request higher-bitrate versions of the media stream.

The server device 602 may include a video content server, an edge server, or similar special purpose or generic server in a datacenter hosting a media service. The client device 632 may include any computing device with video and audio playback capability including, but not limited to, desktop computers, laptop computers, mobile computers, and special purpose devices such as smart watches, smart phones, and other wearable computing devices. The client device 632 may utilize the user interface 634, audio processor 636, and graphics processor 638 to display the received video stream.

Figure 7:
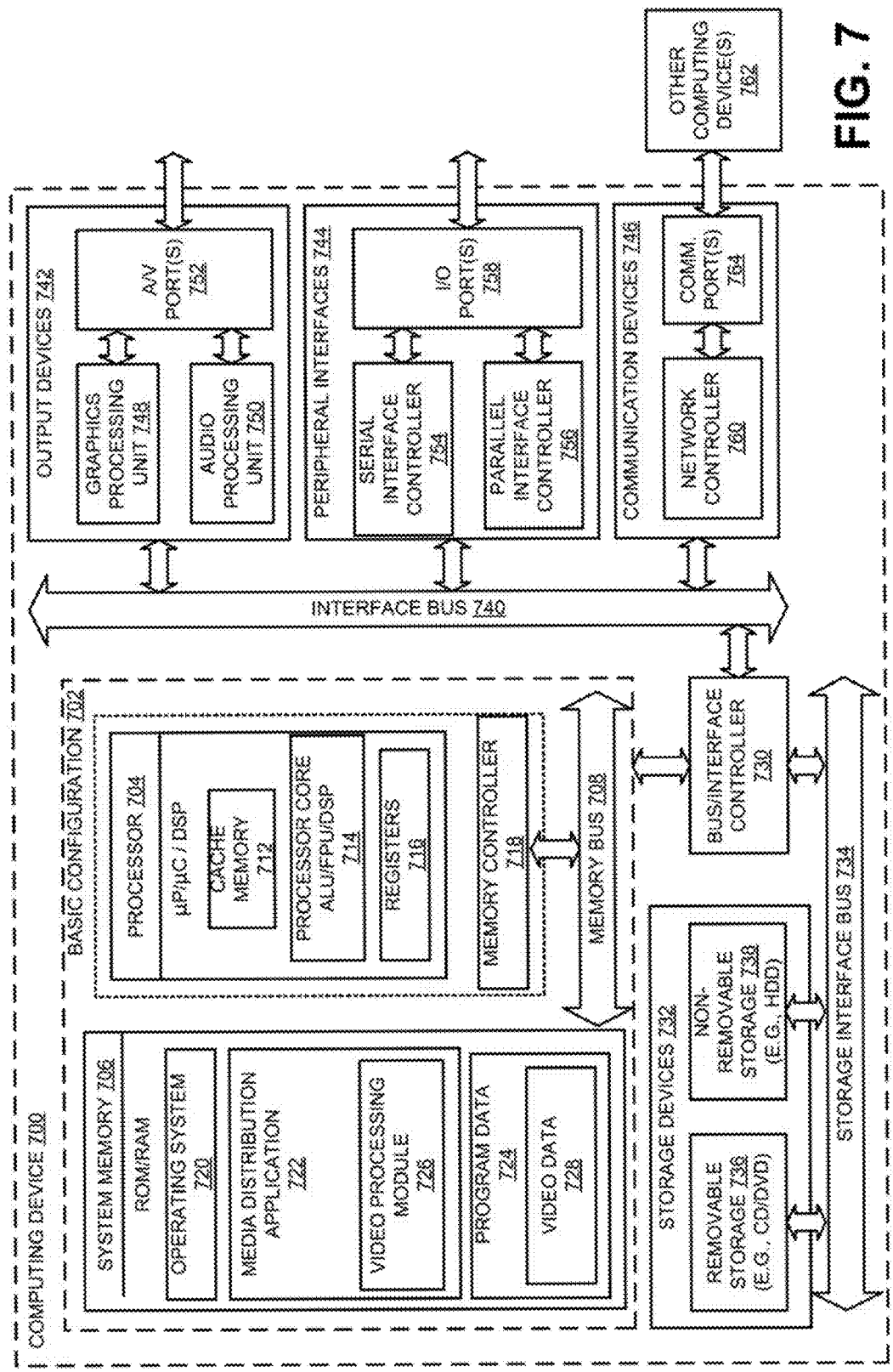
FIG. 7 illustrates a general purpose computing device, which may be associated with video distribution, storage, and streaming over time-varying channels.

FIG. 7 illustrates a general purpose computing device, which may be associated with video distribution, storage, and streaming over time-varying channels, arranged in accordance with at least some embodiments described herein.

For example, the computing device 700 may be used to distribute video as described herein. In an example basic configuration 702, the computing device 700 may include one or more processors 704 and a system memory 706. A memory bus 708 may be used to communicate between the processor 704 and the system memory 706. The basic configuration 702 is illustrated in FIG. 7 by those components within the inner dashed line.

Depending on the desired configuration, the processor 704 may be of any type, including but not limited to a microprocessor (μP), a microcontroller (μC), a digital signal processor (DSP), a Graphics Processing Unit (GPU), or any combination thereof. The processor 704 may include one more levels of caching, such as a level cache memory 712, a processor core 714, and registers 716. The example processor core 714 may include an arithmetic logic unit (ALU), a floating point unit (FPU), a digital signal processing core (DSP Core), application specific integrated circuits (ASIC) or any combination thereof. An example memory controller 718 may also be used with the processor 704, or in some implementations, the memory controller 718 may be an internal part of the processor 704.

Depending on the desired configuration, the system memory 706 may be of any type including but not limited to volatile memory (such as RAM), non-volatile memory (such as ROM, flash memory, etc.) or any combination thereof. The system memory 706 may include an operating system 720, a media distribution application 722, and program data 724. The media distribution application 722 may include a video processing module 726 to implement video distribution over time-varying channels as described herein. The program data 724 may include, among other data, video data 728 or the like, as described herein.

The computing device 700 may have additional features or functionality, and additional interfaces to facilitate communications between the basic configuration 702 and any desired devices and interfaces. For example, a bus/interface controller 730 may be used to facilitate communications between the basic configuration 702 and one or more data storage devices 732 via a storage interface bus 734. The data storage devices 732 may be one or more removable storage devices 736, one or more non-removable storage devices 738, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

The system memory 706, the removable storage devices 736 and the non-removable storage devices 738 are examples of computer storage media. Computer storage media includes, but is not limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 700. Any such computer storage media may be part of the computing device 700.

The computing device 700 may also include an interface bus 740 for facilitating communication from various interface devices (e.g., one or more output devices 742, one or more peripheral interfaces 744, and one or more communication devices 766) to the basic configuration 702 via the bus/interface controller 730. Some of the example output devices 742 include a graphics processing unit 748 and an audio processing unit 750, which may be configured to communicate to various external devices such as a display or speakers via one or more A/V ports 752. One or more example peripheral interfaces 744 may include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 766 includes a network controller 760, which may be arranged to facilitate communications with one or more other computing devices 762 over a network communication link via one or more communication ports 764. The one or more other computing devices 762 may include servers at a datacenter, customer equipment, and comparable devices.

The network communication link may be one example of a communication media. Communication media may be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 700 may be implemented as a part of a general purpose or specialized server, mainframe, or similar computer that includes any of the above functions. The computing device 700 may also be implemented as a personal computer including both laptop computer and non-laptop computer configurations.

Figure 8:
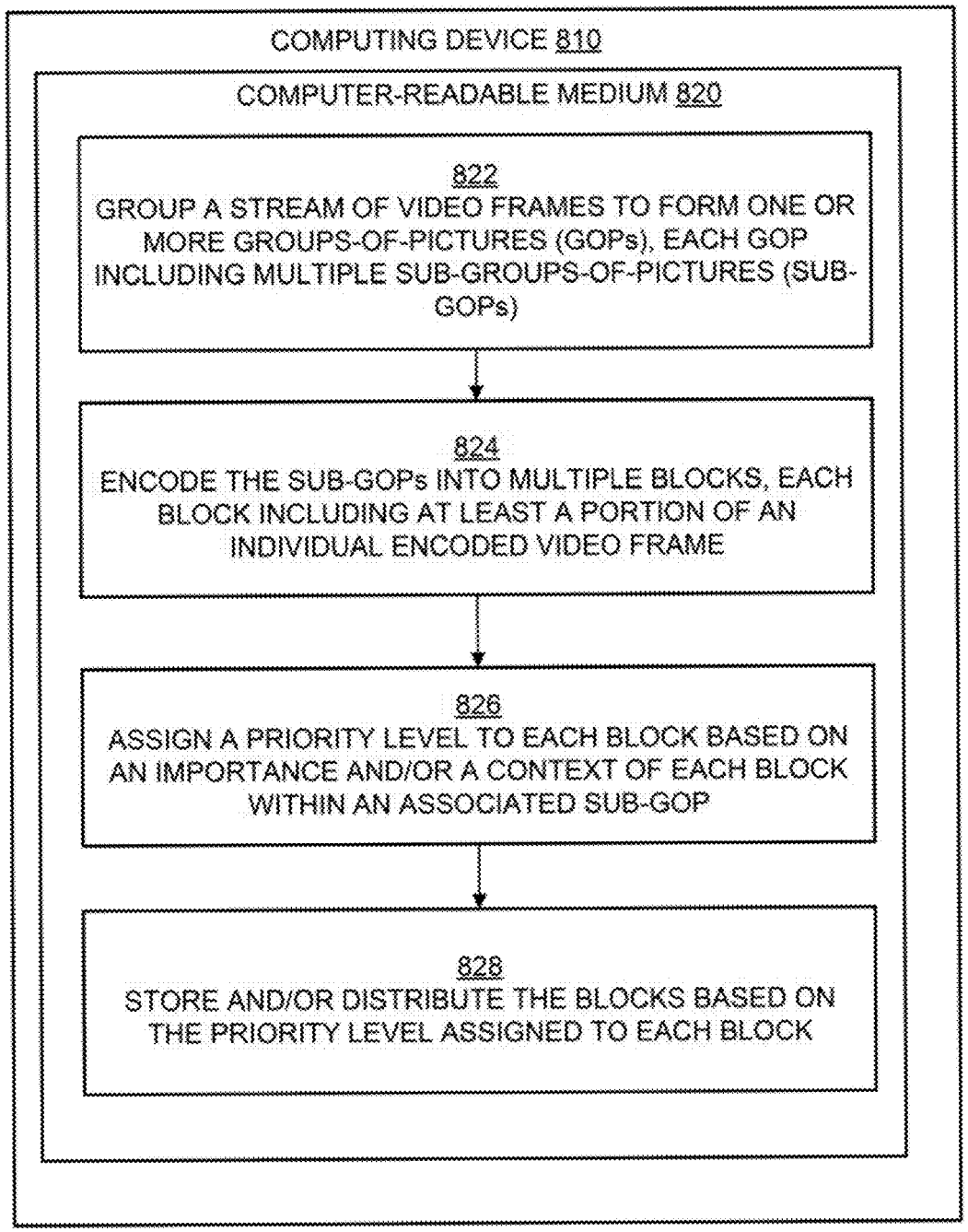
FIG. 8 is a flow diagram illustrating an example process to provide video distribution, storage, and streaming over time-varying channels that may be performed by a computing device such as the computing device in FIG. 7.

FIG. 8 is a flow diagram illustrating an example process to provide video distribution, storage, and streaming over time-varying channels that may be performed by a computing device such as the computing device in FIG. 7, arranged in accordance with at least some embodiments described herein.

Example methods may include one or more operations, functions or actions as illustrated by one or more of blocks 822, 824, 826, and/or 828, and may in some embodiments be performed by a computing device such as the computing device 800 in FIG. 8. The operations described in the blocks 822-828 may also be stored as computer-executable instructions in a computer-readable medium such as a computer-readable medium 820 of a computing device 810.

An example process to distribute video over time-varying channels may begin with block 822, "GROUP A STREAM OF VIDEO FRAMES TO FORM ONE OR MORE GROUPS-OF-PICTURES (GOPs), EACH GOP INCLUD- ING MULTIPLE SUB-GROUPS-OF-PICTURES (SUB-GOPs)", where an encoder may group video data into a number of GOPs, where each GOP includes two or more sub-GOPs, as described in FIG. 4. In some embodiments, the encoder may first decode the stream of video frames before forming the GOPs and sub-GOPs, as described above.

Block 822 may be followed by block 824, "ENCODE THE SUB-GOPs INTO MULTIPLE BLOCKS, EACH BLOCK INCLUDING AT LEAST A PORTION OF AN INDIVIDUAL ENCODED VIDEO FRAME", where the encoder may encode the sub-GOPs into data blocks or data chunks according to frame type and/or partition type, as described above. In some embodiments, the encoder may subdivide video frames into odd and even slices, where each slice includes portions from different positions within the encoded video frame.

Block 824 may be followed by block 826, "ASSIGN A PRIORITY LEVEL TO EACH BLOCK BASED ON AN IMPORTANCE AND/OR A CONTEXT OF EACH BLOCK WITHIN AN ASSOCIATED SUB-GOP", where the encoder may assign different priority levels to the different blocks based on parameters such as frame type, partition type, and/or block position, as described above. In addition, the encoder may assign at least one priority level (and alternative priority) reserved for chunks that may be transmitted only upon requests following failure to receive previously transmitted chunks.

Block 826 may be followed by block 828, "STORE AND/OR DISTRIBUTE THE BLOCKS BASED ON THE PRIORITY LEVEL ASSIGNED TO EACH BLOCK", where the encoder or controller associated with the encoder may provide the encoded blocks to one or more edge servers, where the encoded blocks may be stored and/or distributed based on priority levels, as described above. In addition, on requests made by the client device or upon decisions made by the server based upon occurrence of errors in transmission or reception of one or more of these blocks, certain blocks of alternative priority levels may be distributed that are usually stored but not usually transmitted unless such errors occur.

FIG. 9 illustrates a block diagram of an example computer program product, arranged in accordance with at least some embodiments described herein.

In some examples, as shown in FIG. 9, a computer program product 900 may include a signal bearing medium 902 that may also include one or more machine readable instructions 904 that, when executed by, for example, a processor may provide the functionality described herein. Thus, for example, referring to the processor 704 in FIG. 7, the media distribution application 722 may undertake one or more of the tasks shown in FIG. 9 in response to the instructions 904 conveyed to the processor 704 by the medium 902 to perform actions associated with distributing video as described herein. Some of those instructions may include, for example, instructions to encode a stream of video frames to form one or more groups-of-pictures (GOPs), each GOP including multiple sub-groups-of-pictures (sub-GOPs), divide the stream of encoded video frames into multiple blocks, each block including at least a portion of an individual encoded video frame, assign a priority level to each block based on an importance and/or a context of each block within an associated sub-GOP, and/or store and/or distribute the blocks based on the priority level assigned to each block, according to some embodiments described herein.

In some implementations, the signal bearing media 902 depicted in FIG. 9 may encompass computer-readable media 906, such as, but not limited to, a hard disk drive, a solid state drive, a compact disc (CD), a digital versatile disk (DVD), a digital tape, memory, etc. In some implementations, the signal bearing media 902 may encompass recordable media 908, such as, but not limited to, memory, read/write (R/W) CDs, R/W DVDs, etc. In some implementations, the signal bearing media 902 may encompass communications media 910, such as, but not limited to, a digital and/or an analog communication medium (e.g., a fiber optic cable, a waveguide, a wired communications link, a wireless communication link, etc.). Thus, for example, the program product 900 may be conveyed to one or more modules of the processor 704 by an RF signal bearing medium, where the signal bearing media 902 is conveyed by the wireless communications media 910 (e.g., a wireless communications medium conforming with the IEEE 802.11 standard).

According to some examples, a method to provide video distribution, storage, and streaming over time-varying channels is described. The method may include grouping a stream of video frames to form one or more groups-of-pictures (GOPs), each GOP including multiple sub-groups-of-pictures (sub-GOPs), and encoding the multiple sub-GOPs of video frames into multiple blocks, where each block includes at least a portion of an individual encoded video frame. The method may further include assigning a priority level to each block in the multiple blocks based on an importance and/or a context of each block within an associated sub-GOP and storing and/or distributing the multiple blocks based on the priority level assigned to each block.

According to some embodiments, the method may include receiving the stream of video frames in an encoded state and decoding the encoded stream of video frames prior to encoding the stream. The method may further include determining two or more priority levels to be assigned to the multiple blocks and selecting a storage type and/or a content distribution network path such that an aggregate loss probability is less for blocks with a higher priority level compared to blocks with a lower priority level. Encoding the stream of video frames may include encoding the multiple sub-GOPs such that each sub-GOP begins with a recovery frame. Assigning the priority level to each block may include assigning the priority level based on a block position within an individual encoded video frame, a type of the individual encoded video frame, and/or a partition of the individual encoded video frame.

According to other embodiments, the method may include storing blocks with a higher priority level at a data storage with a lower bit-error-rate compared to blocks with a lower priority level at a data storage with higher bit-error-rate. The method may include transmitting blocks with a higher priority level over a higher quality delivery channel to a requesting client device compared to blocks with a lower priority level over a lower quality delivery channel. The method may further include determining a storage and/or a distribution path for each block based on the priority level assigned to each block at an edge server of a content distribution network.

According to other examples, a content distribution network (CDN) to provide video distribution, storage, and streaming over time-varying channels is described. The CDN may include a content source, a video processing server, and an edge server. The content source may be configured to provide an encoded stream of video frames. The video processing server may be configured to receive the encoded stream of video frames, decode the encoded stream of video frames, and encode the decoded stream of video frames to form one or more groups-of-pictures (GOPs), each GOP including multiple sub-groups-of-pictures (sub-GOPs). The video processing server may be further configured to divide the stream of encoded video frames into multiple blocks, where each block includes at least a portion of an individual encoded video frame, and assign a priority level to each block in the multiple blocks based on an importance and/or context of each block within an associated sub-GOP. The edge server may be configured to store and/or distribute the encoded multiple blocks based on a priority level assigned to each block.

According to some embodiments, the edge server may be further configured to select a storage type and/or a content distribution network path such that an aggregate loss probability is less for blocks with a higher priority level compared to blocks with a lower priority level. The video processing server may be further configured to encode the multiple sub-GOPs such that each sub-GOP begins with a recovery frame and assign the priority level based on a block position within an individual encoded video frame, a type of the individual encoded video frame, and/or a partition of the individual encoded video frame. The edge server may be further configured to store a manifest that describes transmission rates and priority levels assigned to each block, receive a quality of service feedback from a client device, and select a encoding rate for subsequent transmissions to the client device based on the quality of service feedback and priority levels assigned to blocks in the subsequent transmissions.

According to further embodiments, the edge server may be further configured to transmit one or more alternative blocks to the client device in response to receiving an indication of a loss of one or more blocks from the client device. The alternative blocks may be listed in the manifest, and the edge server may be further configured to receive sequential requests for blocks from the client device. The multiple blocks may be created at the video processing server prior to distribution to the edge server, at an edge storage prior to a commencement of video streaming, or in real-time at the edge server as the video stream is transmitted in response to a client request. In some embodiments, the CDN may be a near real-time streaming video service, a hard real-time conversational video service, a multi-cast video service, a display sharing device, or a video store-and-retrieve service.

According to further examples, a client device to receive a video stream over time-varying channels is described. The client device may include a communication module, a display device, and a processor coupled to the communication module and the display device. The communication module may be configured to facilitate wired or wireless communication with an edge server of a content distribution network (CDN). The display device may be configured to display a received stream of encoded video frames organized into one or more groups-of-pictures (GOPs), each GOP including multiple sub-groups-of-pictures (sub-GOPs). The processor may be configured to maintain a manifest file that includes information associated with encoding rates and priority levels assigned to each block of multiple blocks, where the multiple blocks are generated from a division of the stream of encoded video frames into the multiple blocks. In some embodiments, each block may include at least a portion of an individual encoded video frame, and a priority level may be assigned to each block based on an importance and/or a context of each block within an associated sub-GOP. The processor may be further configured to select an encoding rate and one or more blocks for subsequent transmissions from the edge server based on a current quality of service, an occurrence of errors in reception, a transmission of previously requested blocks, and priority levels assigned to the one or more blocks in the subsequent transmissions. The processor may also be configured to transmit the selected encoding rate and information associated with a loss or an error in reception of blocks previously transmitted by the edge server for the subsequent transmissions to the edge server.

According to some embodiments, the processor may be further configured to receive updates to the manifest file.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via application specific integrated circuits (ASICs), field programmable gate arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs executing on one or more computers (e.g., as one or more programs executing on one or more computer systems), as one or more programs executing on one or more processors (e.g., as one or more programs executing on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a compact disc (CD), a digital versatile disk (DVD), a digital tape, a computer memory, a solid state drive, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a data processing system may include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors to move and/or adjust components and/or quantities).

A data processing system may be implemented utilizing any suitable commercially available components, such as those found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to provide video distribution, storage, and streaming over time-varying channels, the method comprising:
    grouping a stream of video frames to form one or more groups-of-pictures (GOPs), wherein each GOP of the one or more GOPs includes a plurality of sub-groups-of-pictures (sub-GOPs);
    encoding the plurality of sub-GOPs of video frames into a plurality of blocks, wherein each block of the plurality of blocks includes at least a portion of an individual encoded video frame;
    determining two or more priority levels to be assigned to the plurality of blocks;
    assigning a priority level to each block, in the plurality of blocks, based on one or more of an importance and a context of each block within an associated sub-GOP;
    one or more of storing and distributing the plurality of blocks based on the priority level assigned to each block;
    selecting one or more of a storage type and a content distribution network path such that an aggregate loss probability is less for blocks with a higher priority level compared to blocks with a lower priority level; and
    transmitting, to a requesting client device, blocks with the higher priority level over a higher quality delivery channel, compared to blocks with the lower priority level which are transmitted over a lower quality delivery channel,
    wherein the transmission of the blocks with the higher priority level over the higher quality delivery channel, compared to the blocks with the lower priority level which are transmitted over the lower quality delivery channel, facilitates a particular quality of service (QoS) being provided for the requesting client device.

2. The method of claim 1, further comprising:
    receiving the stream of video frames in an encoded state; and
    decoding the encoded stream of video frames prior to encoding.

3. The method of claim 1, further comprising:
    determining the aggregate loss probability based on a transfer loss probability associated with the content distribution network path, a storage loss probability associated with the storage type, and a bit loss probability associated with a time-varying transfer channel.

4. The method of claim 1, wherein grouping the stream of video frames comprises:
    encoding the plurality of sub-GOPs such that each sub-GOP begins with a recovery frame.

5. The method of claim 1, wherein assigning the priority level to each block in the plurality of blocks comprises:
    assigning the priority level based on one or more of a block position within the individual encoded video frame, a type of the individual encoded video frame, and a partition of the individual encoded video frame.

6. The method of claim 1, further comprising:
    storing blocks with the higher priority level at a data storage with a lower bit-error-rate, compared to blocks with the lower priority level which are stored at a data storage with higher bit-error-rate.

7. The method of claim 1, further comprising:
    determining one or more of the storage type and the content distribution network path for each block based on the priority level assigned to each block at an edge server of a content distribution network.

8. A content distribution network (CDN) to provide video distribution, storage, and streaming over time-varying channels, the CDN comprising:
    a content source configured to:
        provide an encoded stream of video frames;
    a video processing server, communicatively coupled to the content source, configured to:
        receive the encoded stream of video frames;
        decode the encoded stream of video frames;
        encode the decoded stream of video frames to form one or more groups-of-pictures (GOPs), wherein each GOP of the one or more GOPs includes a plurality of sub-groups-of-pictures (sub-GOPs);
        encode the plurality of sub-GOPs into a plurality of blocks, wherein each block of the plurality of blocks includes at least a portion of an individual encoded video frame; and
        assign a priority level to each block, in the plurality of blocks, based on one or more of an importance and a context of each block within an associated sub-GOP; and
    an edge server, communicatively coupled to the video processing server, configured to:
        one or more of store and distribute the plurality of blocks based on the priority level assigned to each block;
        receive a quality of service feedback from a client device; and
        in response to an indication, in the quality of service feedback received from the client device, of a loss of one or more blocks, transmit one or more alternative blocks to the client device,
        wherein the transmission of the one or more alternative blocks to the client device enables the client device to recover the lost blocks and facilitates a particular quality of service (QoS) being provided for the client device.

9. The CDN of claim 8, wherein the edge server is further configured to:
    select one or more of a storage type and a content distribution network path such that an aggregate loss probability is less for blocks with a higher priority level compared to blocks with a lower priority level.

10. The CDN of claim 8, wherein the video processing server is configured to:
    encode the plurality of sub-GOPs such that each sub-GOP begins with a recovery frame; and
    assign the priority level based on one or more of a block position within the individual encoded video frame, a type of the individual encoded video frame, and a partition of the individual encoded video frame.

11. The CDN of claim 8, wherein the edge server is further configured to:
    store a manifest that describes transmission rates and priority levels assigned to each block; and select an encoding rate for subsequent transmissions to the client device based on the quality of service feedback and priority levels assigned to blocks in the subsequent transmissions.

12. The CDN of claim 11, wherein alternative blocks are listed in the manifest.

13. The CDN of claim 8, wherein the edge server is further configured to:
receive sequential requests for blocks from the client device.

14. The CDN of claim 8, wherein the plurality of blocks is one of:
created at the video processing server prior to distribution to the edge server, created at an edge storage prior to a commencement of video streaming, or created in real-time at the edge server as the video stream is transmitted in response to a client request.

15. The CDN of claim 8, wherein the CDN includes one of:
a near real-time streaming video service, a hard real-time conversational video service, a multi-cast video service, a display sharing service, or a video store-and-retrieve service.

16. A client device to receive a video stream over time-varying channels, the client device comprising:
a communication interface configured to facilitate wired or wireless communication with an edge server of a content distribution network (CDN);
a display device, communicatively coupled to the communication interface, configured to display a received stream of encoded video frames organized into one or more groups-of-pictures (GOPs), wherein each GOP of the one or more GOPs includes a plurality of sub-groups-of-pictures (sub-GOPs); and
a processor coupled to the communication interface and the display device, wherein the processor is configured to:
maintain a manifest file that includes information associated with encoding rates and priority levels assigned to each block of a plurality of blocks, wherein the plurality of blocks are generated from a division of the stream of encoded video frames into the plurality of blocks,
wherein each block includes at least a portion of an individual encoded video frame, and wherein a priority level is assigned to each block based on one or more of an importance and a context of each block within an associated sub-GOP;
select an encoding rate and one or more blocks for subsequent transmissions from the edge server based on a current quality of service, an occurrence of errors in reception, a transmission of previously requested blocks, and priority levels assigned to the one or more blocks in the subsequent transmissions;
transmit, to the edge server, the selected encoding rate and information associated with a loss or an error in reception of blocks previously transmitted from the edge server for the subsequent transmissions; and
receive, from the edge server and after the transmission, alternative blocks to enable recovery from the loss or the error in reception of the previously transmitted blocks, wherein the reception of the alternative blocks facilitates a particular quality of service (QoS) to be provided for the client device.

17. The client device of claim 16, wherein the processor is further configured to:
receive updates to the manifest file.

* * * * *